(12) United States Patent
Inoue et al.

(10) Patent No.: US 10,081,101 B2
(45) Date of Patent: Sep. 25, 2018

(54) ROBOT ARM

(71) Applicant: FANUC CORPORATION, Yamanashi (JP)

(72) Inventors: Toshihiko Inoue, Yamanashi (JP); Tooru Nagai, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 39 days.

(21) Appl. No.: 15/460,325

(22) Filed: Mar. 16, 2017

(65) Prior Publication Data

US 2017/0282358 A1    Oct. 5, 2017

(30) Foreign Application Priority Data

Apr. 4, 2016    (JP) .................................. 2016-075384

(51) Int. Cl.
| | | |
|---|---|---|
| *B25J 9/10* | (2006.01) | |
| *F16H 1/14* | (2006.01) | |
| *F16H 1/20* | (2006.01) | |
| F16H 57/038 | (2012.01) | |
| F16H 57/02 | (2012.01) | |

(52) U.S. Cl.
CPC .............. *B25J 9/102* (2013.01); *F16H 1/145* (2013.01); *F16H 1/206* (2013.01); *F16H 57/038* (2013.01); *F16H 2057/02073* (2013.01); *Y10S 901/23* (2013.01); *Y10S 901/26* (2013.01); *Y10S 901/29* (2013.01)

(58) Field of Classification Search
CPC .................................. B25J 9/102; F16H 1/145
See application file for complete search history.

(56) References Cited

U.S. PATENT DOCUMENTS 5,782,133 A * 7/1998 Kullborg .................. B25J 9/102
                                                74/417
2008/0056859 A1   3/2008 Inoue et al.
(Continued)

FOREIGN PATENT DOCUMENTS

CN    101130247 A    2/2008
CN    103934832 A    7/2014
(Continued)

OTHER PUBLICATIONS

Japanese Decision to Grant a Patent dated Apr. 3, 2018, in connection with corresponding JP Application No. 2016-075384 (6 pgs., including English translation).

*Primary Examiner* — Terence Boes
(74) *Attorney, Agent, or Firm* — Maier & Maier, PLLC

(57) ABSTRACT

Provided is a robot arm including an upper arm, a forearm installed at the distal end of the upper arm, a wrist element installed at the distal end of the forearm to be rotatable around an axis line and having a hollow part through which the axis line penetrates, a motor installed in the forearm and rotating the element around the axis line, and a mechanism transmitting rotation of the motor to the element while reducing speed of rotation. The motor includes a rotation center axis extending obliquely downward on the opposite side of the upper arm. The mechanism includes a hypoid gear set including an output hypoid gear fixed to the element coaxially with the axis line and an input hypoid gear, and a gear set including a gear wheel fixed to the input hypoid gear and a pinion fixed to the motor.

4 Claims, 4 Drawing Sheets

(56) References Cited

U.S. PATENT DOCUMENTS

| | | |
|---|---|---|
| 2014/0020498 A1 | 1/2014 | Adachi |
| 2014/0196563 A1* | 7/2014 | Takahashi et al. |
| 2017/0252920 A1* | 9/2017 | Motomura ............... B25J 9/102 |
| 2017/0274524 A1* | 9/2017 | Inoue ....................... B25J 9/102 |

FOREIGN PATENT DOCUMENTS

| | | |
|---|---|---|
| EP | 1 892 064 A1 | 2/2008 |
| EP | 2 756 930 A2 | 7/2014 |
| JP | H07-000680 U | 1/1995 |
| JP | 2004-351590 A | 12/2004 |
| JP | 4326558 B | 4/2008 |
| JP | 5539454 B | 2/2014 |

* cited by examiner

ROBOT ARM

CROSS-REFERENCE TO RELATED APPLICATIONS

This application claims the benefit of Japanese Patent Application No. 2016-075384, the content of which is incorporated herein by reference.

TECHNICAL FIELD

The present invention relates to a robot arm.

BACKGROUND ART

Conventionally, as a drive mechanism for rotating a robot's wrist unit around the longitudinal axis of the forearm at the distal end of the forearm, there is known one having a hollow part for letting filaments such as cables for driving respective wrist axes of the wrist unit and filaments for peripheral equipment attached to the distal end of the forearm through (for example, see PTL 1).

This drive mechanism has a structure in which a ring-like output hypoid gear connected to the wrist unit is rotatably supported by a proximal end part of the forearm through a bearing coaxially with the longitudinal axis of the forearm, and an input hypoid gear engaged with the output hypoid gear is supported through a bearing so as to be rotatable around an axis line extending in a vertical direction, and a wrist driving motor for supplying rotating force to the input hypoid gear through a spur gear pair is installed so as to extend vertically below the forearm. This helps to secure enough space for the hollow part penetrating through the inside of the forearm in a direction of the longitudinal axis of the forearm, and also enables the wrist unit to be driven to rotate by high torque while reducing speed of rotation from the wrist driving motor in two stages of the spur gear pair and hypoid gear set.

CITATION LIST

Patent Literature

{PTL 1}
the Publication of Japanese Patent No. 4326558

SUMMARY OF INVENTION

An aspect of the present invention is a robot arm that includes: an upper arm that is installed so as to be swingable around a horizontal first axis line; a forearm that is installed at the distal end of the upper arm so as to be swingable around a second axis line perpendicular to a longitudinal axis of the upper arm; a first wrist element that is installed at the distal end of the forearm so as to be rotatable around a third axis line perpendicular to the second axis line, and has a hollow part through which the third axis line penetrates; a motor that is installed in the forearm, and rotates the first wrist element around the third axis line; and a speed reduction mechanism that transmits rotation of the motor to the first wrist element while reducing speed of rotation. The motor includes a rotation center axis extending obliquely downward along a third plane on the opposite side of the upper arm across a first plane; the first plane includes the third axis line and is perpendicular to the second axis line, the third plane is placed closer to the first wrist element than a second plane is, and the second plane includes the second axis line and is perpendicular to the third axis line. The speed reduction mechanism includes a hypoid gear set and a gear set. The hypoid gear set includes an output hypoid gear, which is formed into a ring coaxial with the third axis line and is fixed to the first wrist element, and an input hypoid gear engaged with the output hypoid gear. The gear set includes a gear wheel fixed to the input hypoid gear and a pinion that is fixed to a shaft of the motor and is engaged with the gear wheel.

DESCRIPTION OF EMBODIMENT

A robot arm 1 according to an embodiment of the present invention is described below with reference to drawings.

Figure 1:
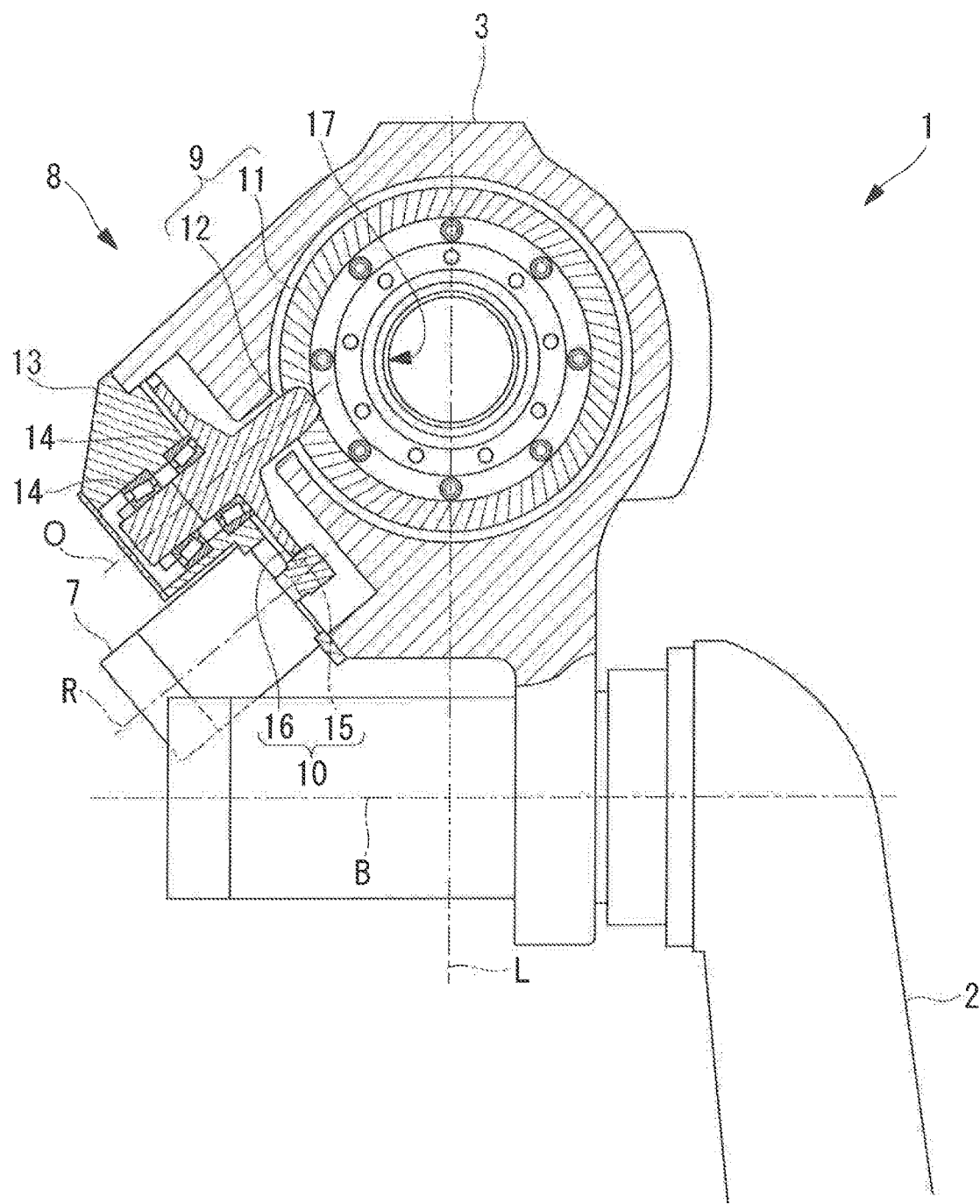
FIG. 1 is a partial transverse cross-sectional view of a forearm of a robot arm according to an embodiment of the present invention.
Figure 2:
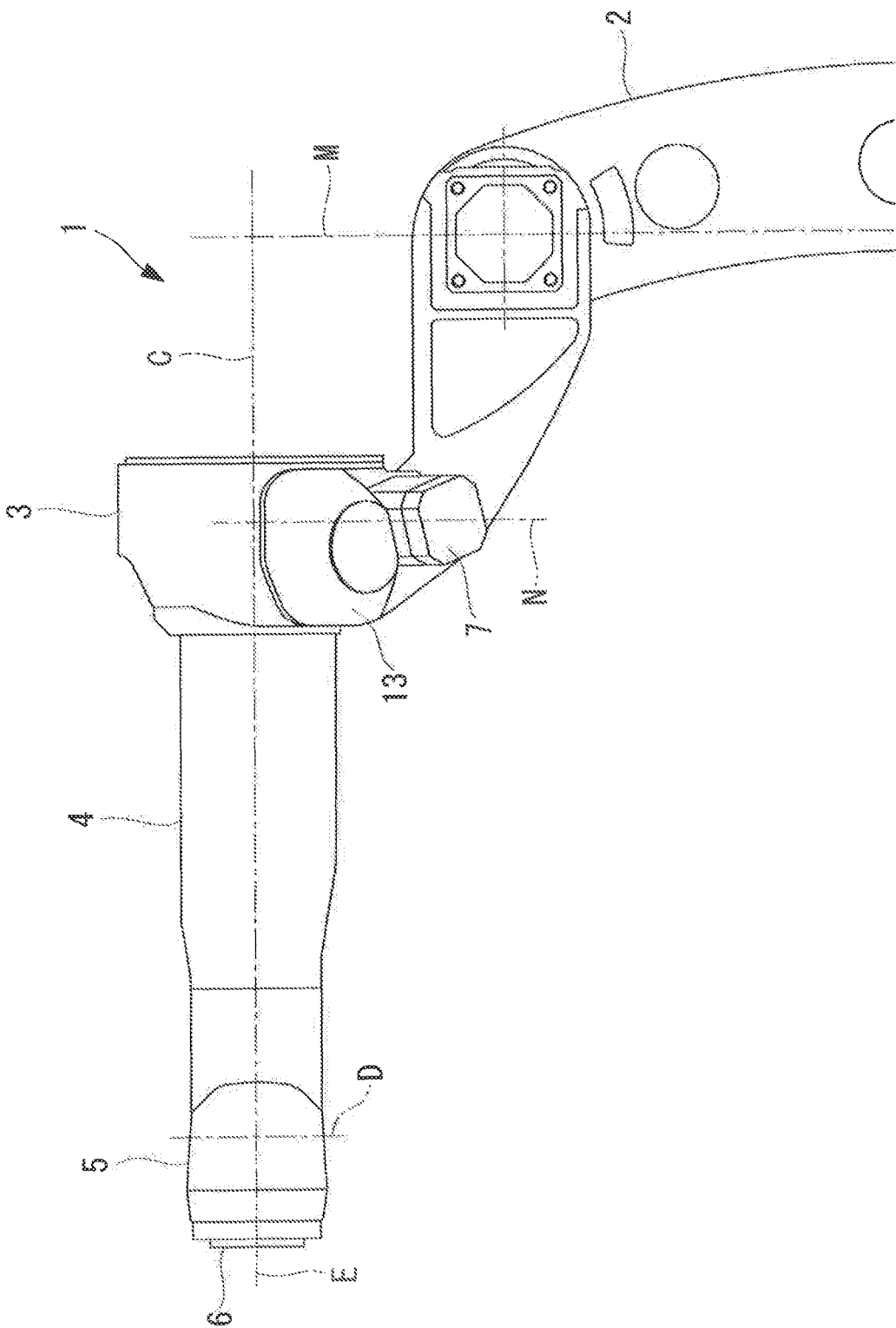
FIG. 2 is a side view of the robot arm shown in FIG. 2.

As shown in FIGS. 1 and 2, the robot arm 1 according to the present embodiment includes an upper arm 2 installed so as to be swingable around a horizontal first axis line, a forearm 3 installed at the distal end of the upper arm 2 so as to be swingable around a horizontal second axis line B parallel to the first axis line, a cylindrical first wrist element 4 installed at the distal end of the forearm 3 so as to be rotatable around a third axis line C perpendicular to the second axis line B, a second wrist element 5 installed so as to be swingable around a fourth axis line D orthogonal to the third axis line C, and a third wrist element 6 installed so as to be rotatable around a fifth axis line E orthogonal to the fourth axis line D.

The forearm 3 includes a motor 7 and a speed reduction mechanism 8; the motor 7 generates rotating force that rotates the first wrist element 4 around the third axis line C, and the speed reduction mechanism 8 transmits the rotation of the motor 7 to the first wrist element 4 while reducing speed of rotation.

As shown in FIG. 1, the motor 7 is installed on the opposite side of the upper arm 2 across a first plane L; the first plane L includes the third axis line C and is perpendicular to the second axis line B. Furthermore, as shown in FIG. 2, the motor 7 includes a rotation center axis R extending obliquely downward as shown in FIG. 1 along a third plane N; the third plane N is placed closer to the first wrist element 4 than a second plane M is, and the second plane M includes the second axis line B and is perpendicular to the third axis line C.

The speed reduction mechanism 8 includes a hypoid gear set 9 and a spur gear set (a gear set) 10.

The hypoid gear set 9 includes an output hypoid gear 11 and an input hypoid gear 12; the output hypoid gear 11 is composed of a ring gear coaxial with the third axis line C, and the input hypoid gear 12 is engaged with the output hypoid gear 11.

The output hypoid gear 11 is fixed to the proximal end of the first wrist element 4.

The input hypoid gear 12 is, as shown in FIG. 1, rotatably supported by a housing member 13 through a pair of bearings 14; the housing member 13 is removably attached to obliquely below the side surface of the forearm 3.

The spur gear set 10 includes a gear wheel 15 and a pinion 16; the gear wheel 15 is composed of a spur gear integral with the input hypoid gear 12, and the pinion 16 is composed of a spur gear fixed to a shaft of the motor 7.

The motor 7 is fixed to the housing member 13 so that its rotation center axis R is placed parallel to a rotation axis line O of the input hypoid gear 12; the housing member 13 rotatably supports the input hypoid gear 12.

The action of the robot arm 1 configured as above according to the present embodiment is described below.

In the robot arm 1 according to the present embodiment, when the pinion 16 fixed to the shaft of the motor 7 is rotated around the rotation center axis R by the actuation of the motor 7, the rotation of the pinion 16 is transmitted to the gear wheel 15 engaged with the pinion 16 while reducing speed of rotation by the reduction ratio based on the gear ratio, and the input hypoid gear 12 integral with the gear wheel 15 is rotated.

When the input hypoid gear 12 is rotated, the rotation of the input hypoid gear 12 is transmitted to the output hypoid gear 11 engaged with the input hypoid gear 12 while reducing speed of rotation by the reduction ration based on the gear ratio. As the output hypoid gear 11 is fixed to the first wrist element 4, the first wrist element 4 is rotated around the third axis line C by the rotation transmitted to the output hypoid gear 11.

That is, the rotation of the motor 7 makes the first wrist element 4 rotate while reducing speed of rotation in two stages by the spur gear set 10, which is composed of the gear wheel 15 and the pinion 16, and the hypoid gear set 9, which is composed of the output hypoid gear 11 and the input hypoid gear 12.

By doing this, a hollow part 17 penetrating to near the distal end of the third wrist element 6 along the third axis line C can be secured around the third axis line C of the forearm 3. That is, as the hollow cylindrical first wrist element 4 is fixed with the output hypoid gear 11 composed of the coaxially-installed ring gear, the hollow part 17 is formed so as to penetrate through the center hole of the output hypoid gear 11 and the first wrist element 4 in a direction along the third axis line C.

Therefore, cables connecting motors (not shown) for driving the second wrist element 5 and the third wrist element 6 that are stored inside the first wrist element 4 and multiple filaments for supplying electric power, signals, wires, gas, etc. to peripheral equipment such as a welding torch, etc. attached to the distal end of the third wrist element 6 can be wired by using this hollow part 17.

Figure 3:
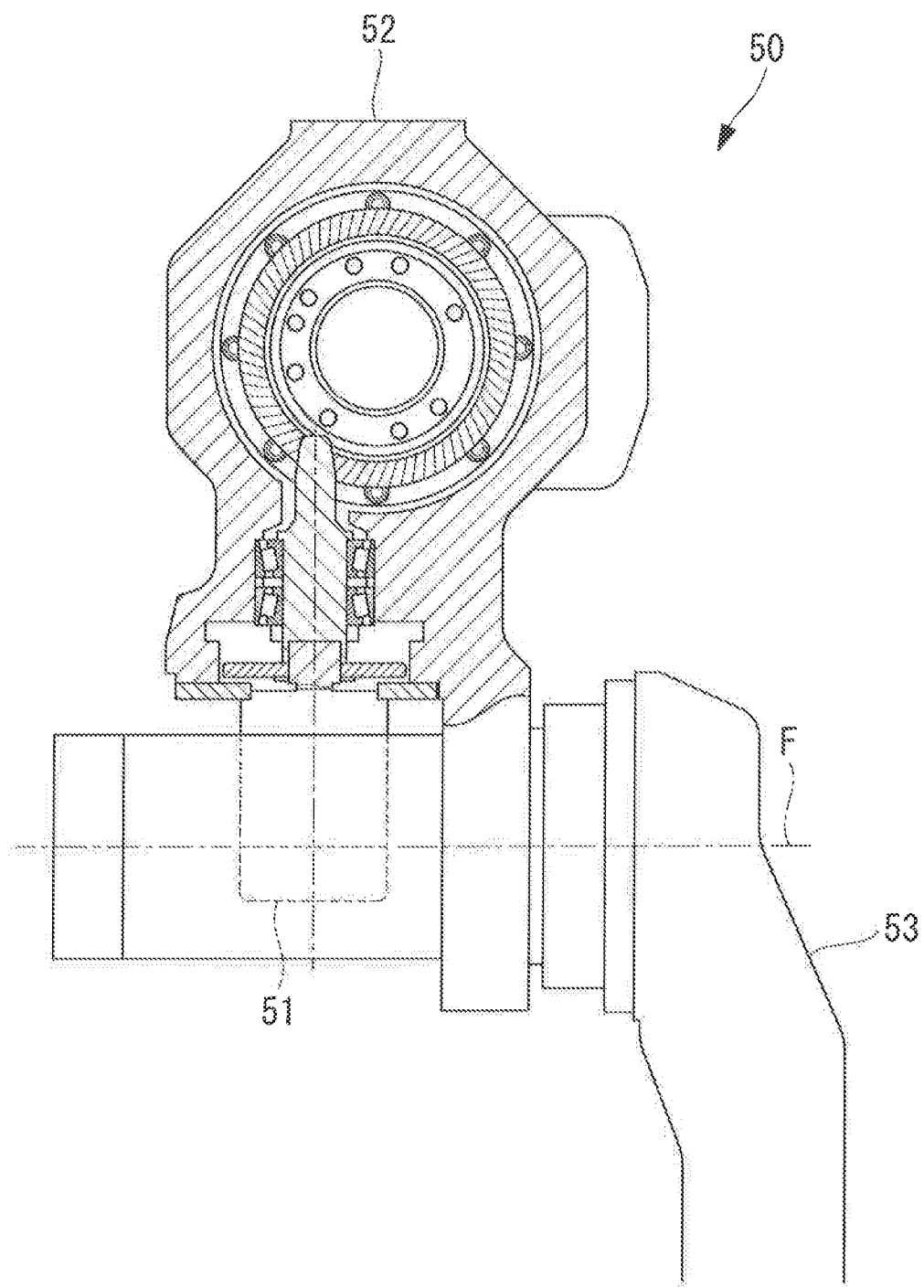
FIG. 3 is a partial transverse cross-sectional view of a forearm of a conventional robot.
Figure 4:
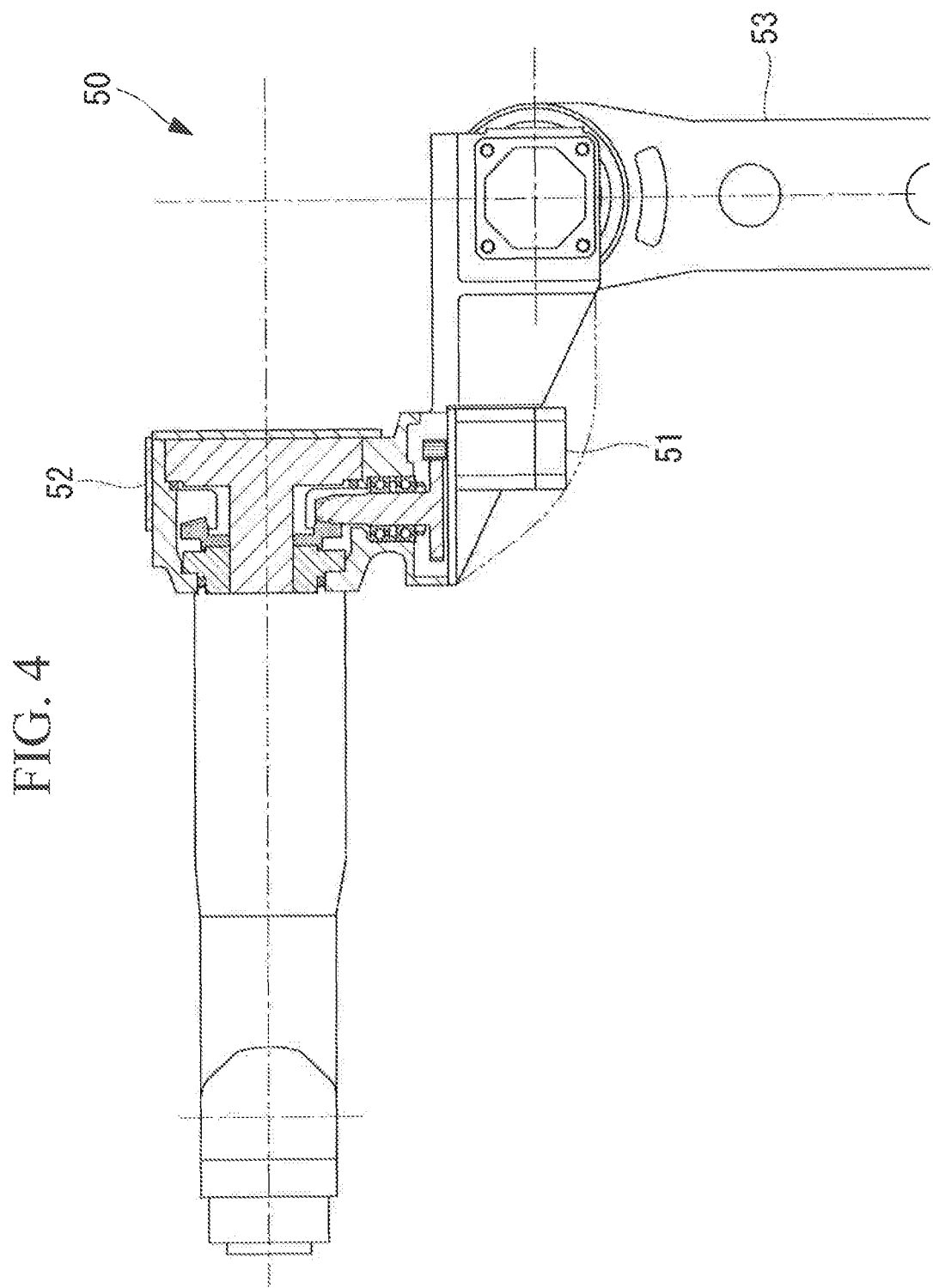
FIG. 4 is a side view showing the robot arm shown in FIG. 3.

In this case, in the present embodiment, the motor 7 for rotating the first wrist element 4 is installed on the opposite side of the upper arm 2 across the first plane L so as to extend obliquely downward along the third plane N; therefore, as shown in FIGS. 3 and 4 as reference examples, compared with a conventional robot arm 50 in which a motor 51 protrudes vertically downward, the robot arm 1 has the advantage that the amount of protrusion of the motor 7 vertically below the forearm 3 can be reduced.

That is, as shown in FIGS. 3 and 4, in the conventional robot arm 50, when an upper arm 53 is swung around a first axis line and is tilted forward, and a forearm 52 is swung around a second axis line F with respect to the upper arm 53 and is maintained in a horizontal posture, the motor 51 protruding below the forearm 52 is highly likely to interfere with a peripheral object located below the forearm 52; however, in the robot arm 1 according to the present embodiment, as shown in FIG. 2, the motor 7 can be installed almost within the border of a part composing the forearm 3, and there is an advantage that the possibility for the motor 7 to interfere with a peripheral object can be reduced.

Furthermore, in the robot arm 1 according to the present embodiment, the input hypoid gear 12 and the gear wheel 15 are integrally formed, so the number of parts is fewer than separately manufacturing and assembling these; therefore, there is an advantage that the manufacturing cost and the assembly cost can be reduced.

Moreover, the input hypoid gear 12 integrally formed with the gear wheel 15 in this way is rotatably mounted on the housing member 13 by the bearings 14, and the motor 7 with the pinion 16 engaged with the gear wheel 15 attached to the shaft thereof is fixed to the same housing member 13; therefore, in a state where the engagement of the spur gear set 10 has been adjusted, the motor 7 and the input hypoid gear 12 can be manufactured as a sub-assembly and be mounted on the forearm 3 in a sub-assembly state. Accordingly, the number of parts can be minimized.

Furthermore, there is an advantage that the pinion 16 attached to the motor 7 and the gear wheel 15 integrally formed with the input hypoid gear 12 are each composed of a spur gear, which prevents force along the axial direction from being generated at the engagement position in accordance with the rotation of the motor 7. Accordingly, axial force acting on the motor 7 can be reduced, and the motor 7 can be maintained in the healthy condition.

From the above-described embodiment, the following invention is derived.

An aspect of the present invention is a robot arm that includes: an upper arm that is installed so as to be swingable around a horizontal first axis line; a forearm that is installed at the distal end of the upper arm so as to be swingable around a second axis line perpendicular to a longitudinal axis of the upper arm; a first wrist element that is installed at the distal end of the forearm so as to be rotatable around a third axis line perpendicular to the second axis line, and has a hollow part through which the third axis line penetrates; a motor that is installed in the forearm, and rotates the first wrist element around the third axis line; and a speed reduction mechanism that transmits rotation of the motor to the first wrist element while reducing speed of rotation. The motor includes a rotation center axis extending obliquely downward along a third plane on the opposite side of the upper arm across a first plane; the first plane includes the third axis line and is perpendicular to the second axis line, the third plane is placed closer to the first wrist element than a second plane is, and the second plane includes the second axis line and is perpendicular to the third axis line. The speed reduction mechanism includes a hypoid gear set and a gear set. The hypoid gear set includes an output hypoid gear, which is formed into a ring coaxial with the third axis line and is fixed to the first wrist element, and an input hypoid gear engaged with the output hypoid gear. The gear set includes a gear wheel fixed to the input hypoid gear and a pinion that is fixed to a shaft of the motor and is engaged with the gear wheel.

According to the present aspect, when the pinion fixed to the shaft of the motor is rotated by the actuation of the motor, the rotation of the pinion is transmitted to the gear wheel engaged with the pinion while reducing speed of rotation, and the input hypoid gear fixed to the gear wheel is rotated. When the input hypoid gear is rotated, the rotation of the input hypoid gear is transmitted to the output hypoid gear engaged with the input hypoid gear while reducing speed of rotation, and the first wrist element fixed to the output hypoid gear is rotated around the third axis line. That is, the rotation of the motor makes the first wrist element rotate while reducing speed of rotation in two stages by the gear set, which is composed of the gear wheel and the pinion, and the hypoid gear set.

In this case, the motor includes the rotation center axis extending obliquely downward along the third plane on the opposite side of the upper arm across the first plane; the first plane includes the third axis line and is perpendicular to the second axis line, the third plane is placed closer to the first wrist element than the second plane is, and the second plane includes the second axis line and is perpendicular to the third axis line. Therefore, compared with a conventional drive mechanism that protrudes vertically downward, the amount of protrusion of the motor vertically below the forearm can be reduced. Consequently, it is possible to reduce the possibility for the motor protruding below the forearm to interfere with a peripheral object when the upper arm is swung forward around the first axis line.

In the above-described aspect, the input hypoid gear and the gear wheel may be integrally formed.

By doing this, the number of parts can be reduced, and the transmission of driving torque from the gear wheel to the input hypoid gear can be performed more certainly.

Furthermore, in the above-described aspect, the motor and the input hypoid gear may be mounted on the same housing member in a state where the pinion is engaged with the gear wheel, and the housing member can be fixed to the forearm.

By doing this, the motor and the input hypoid gear can be mounted on the same housing member in a state where the pinion is engaged with the gear wheel, and the motor and the input hypoid gear can be manufactured as a sub-assembly, and the number of parts can be minimized.

Moreover, in the above-described aspect, the gear wheel and the pinion may be spur gears.

This prevents axial force from acting on the shaft of the motor.

REFERENCE SIGNS LIST

1 Robot arm
2 Upper arm
3 Forearm
4 First wrist element
7 Motor
8 Speed reduction mechanism
9 Hypoid gear set
10 Spur gear set (gear set)
11 Output hypoid gear
12 Input hypoid gear
13 Housing member
14 Gear wheel
15 Pinion
16 Hollow part
B Second axis line
C Third axis line
L First plane
M Second plane
N Third plane
R Rotation center axis

The invention claimed is:

1. A robot arm comprising:
   an upper arm that is installed so as to be swingable around a horizontal first axis line;
   a forearm that is installed at a distal end of the upper arm so as to be swingable around a second axis line perpendicular to a longitudinal axis of the upper arm;
   a first wrist element that is installed at a distal end of the forearm so as to be rotatable around a third axis line perpendicular to the second axis line, and has a hollow part through which the third axis line penetrates;
   a motor that is installed in the forearm, and rotates the first wrist element around the third axis line; and
   a speed reduction mechanism that transmits rotation of the motor to the first wrist element while reducing speed of rotation, wherein
   the motor includes a rotation center axis extending obliquely downward along a third plane on the opposite side of the upper arm across a first plane, the first plane including the third axis line and being perpendicular to the second axis line, the third plane being placed closer to the first wrist element than a second plane is, the second plane including the second axis line and being perpendicular to the third axis line, and
   the speed reduction mechanism includes:
      a hypoid gear set that includes an output hypoid gear, which is formed into a ring coaxial with the third axis line and is fixed to the first wrist element, and an input hypoid gear engaged with the output hypoid gear; and
      a gear set that includes a gear wheel fixed to the input hypoid gear and a pinion that is fixed to a shaft of the motor and is engaged with the gear wheel.

2. The robot arm according to claim 1, wherein the input hypoid gear and the gear wheel are integrally formed.

3. The robot arm according to claim 1, wherein
   the motor and the input hypoid gear are mounted on the same housing member in a state where the pinion is engaged with the gear wheel, and
   the housing member is fixed to the forearm.

4. The robot arm according to claim 1, wherein the gear wheel and the pinion are spur gears.

* * * * *